No. 766,685. PATENTED AUG. 2, 1904.
C. F. GARLAND.
SAFETY RACK FOR COATS, HATS, UMBRELLAS, &c.
APPLICATION FILED JAN. 21, 1902.
NO MODEL.
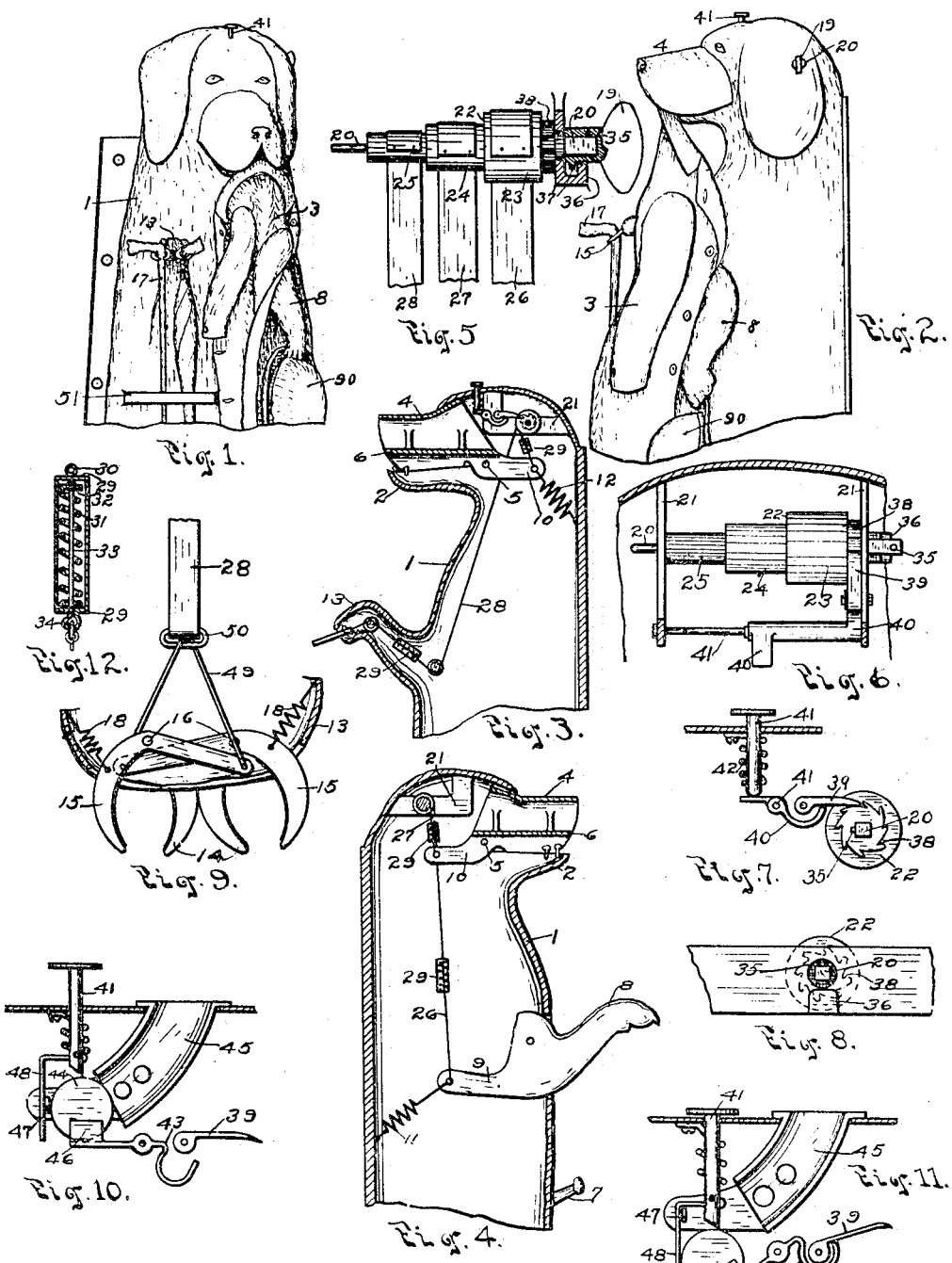

No. 766,685.                                                                 Patented August 2, 1904.

UNITED STATES PATENT OFFICE.

CHARLES F. GARLAND, OF CLEVELAND, OHIO.

SAFETY-RACK FOR COATS, HATS, UMBRELLAS, &c.

SPECIFICATION forming part of Letters Patent No. 766,685, dated August 2, 1904.

Application filed January 21, 1902. Serial No. 90,657. (No model.)

*To all whom it may concern:*

Be it known that I, CHARLES F. GARLAND, a citizen of the United States, residing at Cleveland, in the county of Cuyahoga and State of Ohio, have invented a new and useful Improvement in Safety-Racks for Coats, Hats, Umbrellas, &c., of which the following is a specification.

This invention relates to racks for use in barber-shops, hotels, cafés, &c., and has particular reference to the locking features, whereby the device is made a safety-rack for coats, hats, umbrellas, and canes. Great annoyance and loss constantly arise in barber-shops, for example, owing to the fact that coats, &c., are hung up without being carefully guarded and are carried away either by design or mistake. In order to overcome this annoyance and loss and to make the patrons of the shop feel that their belongings are perfectly safe while their backs are turned, I have invented the rack that is shown in the accompanying drawings, in which—

Figure 1 shows a front elevation of my improved rack, which for convenience and attractiveness of design is mounted in a frame having the general appearance of a dog. Fig. 2 is a side elevation of the same, showing the hat, coat, and cane secured in place. Fig. 3 is a vertical section through Fig. 1 looking to the left, the coat, &c., being removed. Fig. 4 shows a similar section looking toward the right. Figs. 5, 6, 7, and 8 show detail views of the means for operating and controlling the various locking devices. Fig. 9 is a detail view of the claws of the dog for holding the cane and umbrella. Figs. 10 and 11 show in different positions a modified form of controlling device for the locks, which comprises a coin in the slot device; and Fig. 12 shows in section a spring device which I prefer to use to make the locking devices self-adjustable to suit articles of various sizes.

Similar reference characters designate corresponding parts throughout the several views of the drawings, in which—

1 represents the frame for carrying the various locking devices, which, because of the appropriate location of the various members and of its attractive appearance generally, I make in the form of the upper part of a dog when he is standing erect. It will be understood, however, that other designs of the frame may be employed, and especially the likeness of any other suitably-shaped member of the animal kingdom may be selected instead of a dog. The lower jaw 2 of the dog is stationary and is intended to serve as a means of support for the coat 3, (shown in Fig. 2,) the lower front teeth affording suitable pegs for holding the coat in position. The upper jaw 4 is pivoted at 5, and means hereinafter described are provided for closing the jaw down to lock the coat in position in the dog's mouth, the bridge or roof 6 of the mouth pressing down upon the lower teeth, while the upper lips, overlapping the sides of the lower jaw, securely clamp the coat in place.

7 is a peg which projects from the body of the dog below the paw 8 and is adapted to support a hat 90, the hat being hung upon the peg. The paw is then caused to close down against the brim of the hat just above the peg to prevent the hat from being removed until the paw is lifted.

Both the paw 8 and the upper jaw 4 are provided with extensions 9 and 10, respectively, which project beyond the pivots, so as to convert these parts into levers of the first class, and by applying power to these extensions the dog's jaw and paw can be moved downwardly, as described. Normally these parts are held up by means of springs 11 and 12, which pull downwardly on the extensions. The other front paw, which is shown at 13 and is illustrated in detail in Fig. 9, is intended for holding canes and umbrellas, which it does by clamping the claws together about the same. The inner claws 14 are stationary, while the outer claws 15 are pivoted at an intermediate point 16, so that the outer ends of the same can be swung inwardly to clamp the canes, &c., between themselves and the inner claws. Fig. 2 shows a cane 17 held in this manner. The claws 15 are normally held outwardly by means of springs 18, which are secured to the claws beyond the pivot and at the other end are attached to the interior of the dog's foot. The claws are closed by applying power to the inner ends in the same way as with the jaw and paw 8. The power for operating all these various parts is supplied by hand by means of a key 19, which is represented by dotted lines in Fig. 5. This key is applied to a shaft 20, which is squared at one end and is journaled in suitable brackets 21, which project from the inner part of the dog's head. Secured to the shaft and turning therewith is a stepped pulley or roller 22, which is, as shown, made up of the parts 23, 24, and 25. To these parts is secured one end of flexible tapes or bands 26, 27, and 28, respectively, in such a manner that they will be wound thereon as the roller 22 is turned. The opposite ends of these tapes are secured to the extensions 9 and 10 and to the rear ends of the claws 15, so that when the roller is turned by the key 19 the jaw 4, paw 8, and claws 15 will be closed. The tapes may be made of any suitable material and they may be of one continuous piece; but I prefer to make them of steel and to insert somewhere in their length a self-adjusting device, such as is shown in Fig. 12. This device consists of an outer frame-piece 29, to one end of which the tape is secured, as at 30. Within the frame-piece is a helical spring 31, which bears at one of its ends against the frame-piece opposite the end to which the tape is secured.

32 is a plate to which a stem 33 is attached, the stem passing through the spring and out beyond the frame-piece and the plate bearing against the opposite end of the spring. The tape is parted for the insertion of this device, one end of the same being attached thereto at 30 and the other being secured to the stem 33 at 34. When a pull is exerted upon the tape and the pull encounters resistance, as when the dog's mouth is closed against a coat, the spring will be compressed, the plate 32 and rod 33 moving in the frame-piece as a piston in a cylinder. The spring is so constructed that it will admit of but a slight amount of motion until its different coils are pressed together. If this were not so, it would be possible to pry the dog's jaw, paw, or claws back, and thus release the coat, &c., that he was holding; but the motion permitted by this device is just sufficient to allow for differences in the size of coats, &c., without making it possible to pry the jaws, &c., apart.

It is of course necessary to prevent the device from being unlocked by any person except the party whose belongings it is holding. For this reason the shaft 20 is formed with a small lug 35 and the key 19 is provided with a slot or groove corresponding therewith, so that but one key can be used to unlock the device. It is also desirable that the key be always in position when the device is not in use. For this reason the frame 1 is provided with a lug 36, behind which a pin 37 on the key 19 is adapted to engage at this time. The pin will, however, free itself from the lug as soon as the key has been turned to lock the various parts, and the key may then be removed to be retained by the party who has locked up his coat, &c., until such time as he may be ready for them again.

In order to hold the roller 22 from backward rotation until it is desired to unlock the device, I provide the same with a ratchet-wheel 38, with which engages a detent-pawl 39. When this pawl is lifted the springs for opening the mouth, &c., will cause the roller to rotate backwardly. The detent-pawl is lifted by means of a curved lever 40, which is journaled upon a transverse rod 41, extending between the brackets 21, and the lever is rocked by the depression of a pin or button 41, that projects from the top of the dog's head, the button being normally held outwardly by a coiled spring 42, that is secured to the inner end thereof.

As will be evident means must be provided for preventing the unlocking of the device by unauthorized persons by simply depressing the button 41. For this purpose the teeth of the ratchet-wheels 38 are made to overhang, as is shown in Figs. 7 and 8, so that the detent-pawl cannot be lifted until the roller 22 has been turned slightly forward, which can only be done by the party having the key 19. It will thus be seen that when a person locks up his coat, &c., they cannot be removed until he turns the roller back with the key.

In some cases the proprietors object to the expense of procuring the racks and prefer that their patrons pay for the privilege of using the same. For this reason I may provide the device with a coin-controlled apparatus, (shown in Figs. 10 and 11,) so that the coat, &c., cannot be unlocked until a coin has been dropped into a slot. As previously described, 41 is a push button or pin which projects from the top of the dog's head, by depressing which the device may be unlocked. In this form, however, the lever 43 for lifting the detent-pawl 39 is placed too low to be reached by the end of the pin 41 and can be rocked only when a coin 44 is inserted through the chute 45. This coin lodges on the lever 43, being held in place below the pin 41 by wings 46 on the lever and by a stationary stop 47 on the frame. When the pin is depressed, it causes the coin to rock the lever 43 and lift the detent-pawl. As appears from Fig. 11, the coin would roll off the lever and thus permit the detent to drop again if it were not for an arm 48 which depends from the pin 41 and remains in front of the coin until the pin is released, when it withdraws and permits the coin to fall into the receptacle (not shown) that is intended to receive it.

As the cane and the umbrella-handle may be of different diameters, one of the claws 15 may enter into clamping engagement earlier than the other, and thus leave the article on the other side loose and easily extracted. To overcome this, the tape 28 is connected with the claws by a flexible band 49, which passes loosely through an eyepiece 50 in the end of the tape. With this construction when the claws engage on one side all the motion of the tape is transmitted to the other claw 15.

The racks may be supported in any suitable manner, but I prefer to attach them to the walls of the room, and for that reason the backs of the frame 1 are made flat, as shown. To assist in holding the cane and umbrella, I prefer to provide the rack with a bracket 51, through holes in which the cane, &c., is adapted to project, as is shown in Fig. 1.

From this description it will be seen that I have invented a device that is unique in design and is, moreover, economical in manufacture, simple in construction, and positive in operation.

Having thus described my invention, what I claim as new, and desire to secure by Letters Patent, is—

1. In a device of the character described, a frame made in the shape of an animal's body, a jaw forming part of the animal's head, projections representing the animal's teeth on the said jaw, an upper jaw, lips on said upper jaw which overlap the sides of the lower jaw when the animal's mouth is closed, and means for producing a relative movement between the said upper jaw and the teeth for holding an article of apparel thereon.

2. In a device of the character described, a frame made in the shape of an animal's body, a lower jaw forming part of the animal's head, projections representing teeth on the said jaw, an upper jaw movable toward the teeth for holding an article of apparel thereon, lips on said upper jaw which overlap the sides of the lower jaw when the animal's mouth is closed, and means for locking said jaw in its moved position.

3. In a device of the character described, a frame made in the shape of an animal's body, a lower jaw forming part of the animal's head upon which an article of apparel may be supported, an upper jaw, lips on said upper jaw which overlap the sides of the lower jaw when the animal's mouth is closed, and means for producing a relative movement between the jaws so as to clamp the said article.

4. In a device of the character described, a frame made in the form of the body of an animal, a stationary and a movable jaw which are adapted to hold a coat, a peg projecting from the body of the animal for supporting a hat, a paw movable into engagement with the hat for holding the same in position, a stationary paw, stationary and movable claws in said paw between which a cane and umbrella may be clamped, and means common to the movable jaw, the movable paw, and the movable claws for locking them so as to hold the various articles in position.

5. In a device of the character described, a frame, a stationary member upon which an article of apparel is adapted to hang, a movable member coöperating with the stationary member to hold said article in position, a roller, a tape secured to the roller and to the movable member, a key for turning the roller to move the member, and means for holding the roller in position.

6. In a device of the character described, a frame, a stationary member upon which an article of apparel is adapted to hang, a movable member coöperating with the stationary member to hold said article in position, a roller, a tape secured to the roller and to the movable member, a key for turning the roller to move the member, a ratchet-wheel with overhanging teeth and a detent-pawl for holding the roller in position, and a push-button for lifting the detent-pawl to release the roller.

7. In a device of the character described, a frame, a stationary member for supporting an article of apparel, a pivoted member for holding the article on the stationary member, a shaft that is squared at one end for the insertion of the key, a roller carried by said shaft, a tape secured to said roller and to said pivoted member for operating the latter, a key for turning the roller, said key having a lug and fitting a squared shaft when in but one position, and a lug on the frame for engaging with the lug on the key to prevent the removal of the latter except when the pivoted member has been moved toward the stationary member.

8. In a device of the character described, a frame made in the shape of an animal's body, a stationary jaw and a movable jaw for holding a coat in position, a peg projecting from the frame for supporting a hat, a paw that is movable into engagement with the hat to hold the same in position, a stationary paw having stationary and movable claws for clamping an umbrella and cane, a roller mounted in the frame, tapes connecting the roller with the movable jaw, the movable paw and the movable claws, means for turning the roller to wind up the tapes, and means for holding the roller from backward rotation.

9. In a device of the character described, a frame, a plurality of movable members for locking a corresponding number of articles of apparel in position, a stepped roller mounted in the frame, flexible connections between the various steps of the roller and the movable members, a key for turning said roller, a ratchet-wheel carried by the roller, a detent-pawl engaging the ratchet-wheel to prevent backward rotation of the roller, and a push pin or button for lifting the detent-pawl to free the roller.

10. In a device of the character described, a frame made in the shape of an animal's body, a member representing an animal's lower jaw upon which an article of apparel may be hung, another member representing the upper jaw, the lips on which overlap the sides of the other member when the animal's mouth is closed, a device projecting from the animal's body upon which a hat may be hung, a paw that is pivoted within the frame and projects outside the latter, and means for producing a simultaneous movement between the jaws and between the said device and the paw, for the purpose specified.

11. In a device of the character described, a frame made in the shape of an animal's body, a member representing the animal's lower jaw upon which an article of apparel may be hung, another member representing the upper jaw, a device projecting from the animal's body upon which a hat may be hung, a paw that is pivoted within the frame and projects outside the latter, a roller, and tapes connecting the roller with one of the jaws and with the paw so that the animal's mouth may be closed and the paw operated simultaneously.

12. In a device of the character described, a frame made in the shape of an animal's body, a member representing the animal's lower jaw upon which an article of apparel may be hung, another member representing the upper jaw, a device projecting from the animal's body upon which a hat may be hung, a paw that is pivoted within the frame and projects outside the latter, a roller, tapes connecting the roller with one of the jaws and with the paw so that the animal's mouth may be closed and the paw operated simultaneously, and springs interposed in said tapes, for the purpose specified.

In testimony whereof I affix my signature in the presence of two witnesses.

CHAS. F. GARLAND.

Witnesses:
S. E. FOUTS,
C. A. JUDSON.